United States Patent [19]

Kwauka

[11] Patent Number: 4,711,612
[45] Date of Patent: Dec. 8, 1987

[54] PALLETING DEVICE

[75] Inventor: Gerd-Georg Kwauka, Gutersloh, Fed. Rep. of Germany

[73] Assignee: Mohndruck Graphische Betriebe GmbH, Fed. Rep. of Germany

[21] Appl. No.: 716,362

[22] Filed: Mar. 26, 1985

[30] Foreign Application Priority Data

Mar. 27, 1984 [DE] Fed. Rep. of Germany ....... 3411295

[51] Int. Cl.$^4$ ............................................. B65G 57/24
[52] U.S. Cl. .................................... 414/68; 198/424; 414/82; 414/84
[58] Field of Search ..................... 198/424, 431, 594; 414/57, 68, 110, 70, 73, 86, 87, 88, 76, 77, 82, 84

[56] References Cited

U.S. PATENT DOCUMENTS

| T998,009 | 9/1980 | Bevan | 414/114 X |
| 2,141,859 | 12/1938 | Green | 198/424 |
| 3,148,780 | 9/1964 | Lindemann | 414/50 |
| 3,257,015 | 6/1966 | Annable et al. | 414/68 X |
| 4,265,354 | 5/1981 | Sinnema | 198/424 X |
| 4,614,473 | 9/1986 | Kwaüka et al. | 414/68 |

FOREIGN PATENT DOCUMENTS

| 2718338 | 10/1978 | Fed. Rep. of Germany . | |
| 3024133 | 1/1982 | Fed. Rep. of Germany . | |
| 3139828 | 4/1983 | Fed. Rep. of Germany . | |
| 129657 | 10/1979 | Japan | 414/88 |
| 291850 | 3/1971 | U.S.S.R. | 414/88 |

Primary Examiner—Robert J. Spar
Assistant Examiner—Janice Krizek
Attorney, Agent, or Firm—Goodman & Teitelbaum

[57] ABSTRACT

A device for the palleting of slab-form products, especially of book blocks or books, being provided with a feed arrangement for the products, an arrangement for the formation of a product row, and an arrangement for the reception of a product layer including several product rows, the reception arrangement including a simple single rolling band, and in particular, a double rolling band with an endlessly guided upper band and an endlessly guided lower band arranged directly under the upper band, and a drive member for advancing and retracting the rolling band. The upper and lower bands are driven oppositely in the retraction, in such a manner that the upper band portion of the upper band and the lower band portion of the lower band are rolled off the product layer and pallet, respectively. The upper band and the lower band stand still relatively to each other in the advancing of the double rolling band.

20 Claims, 5 Drawing Figures

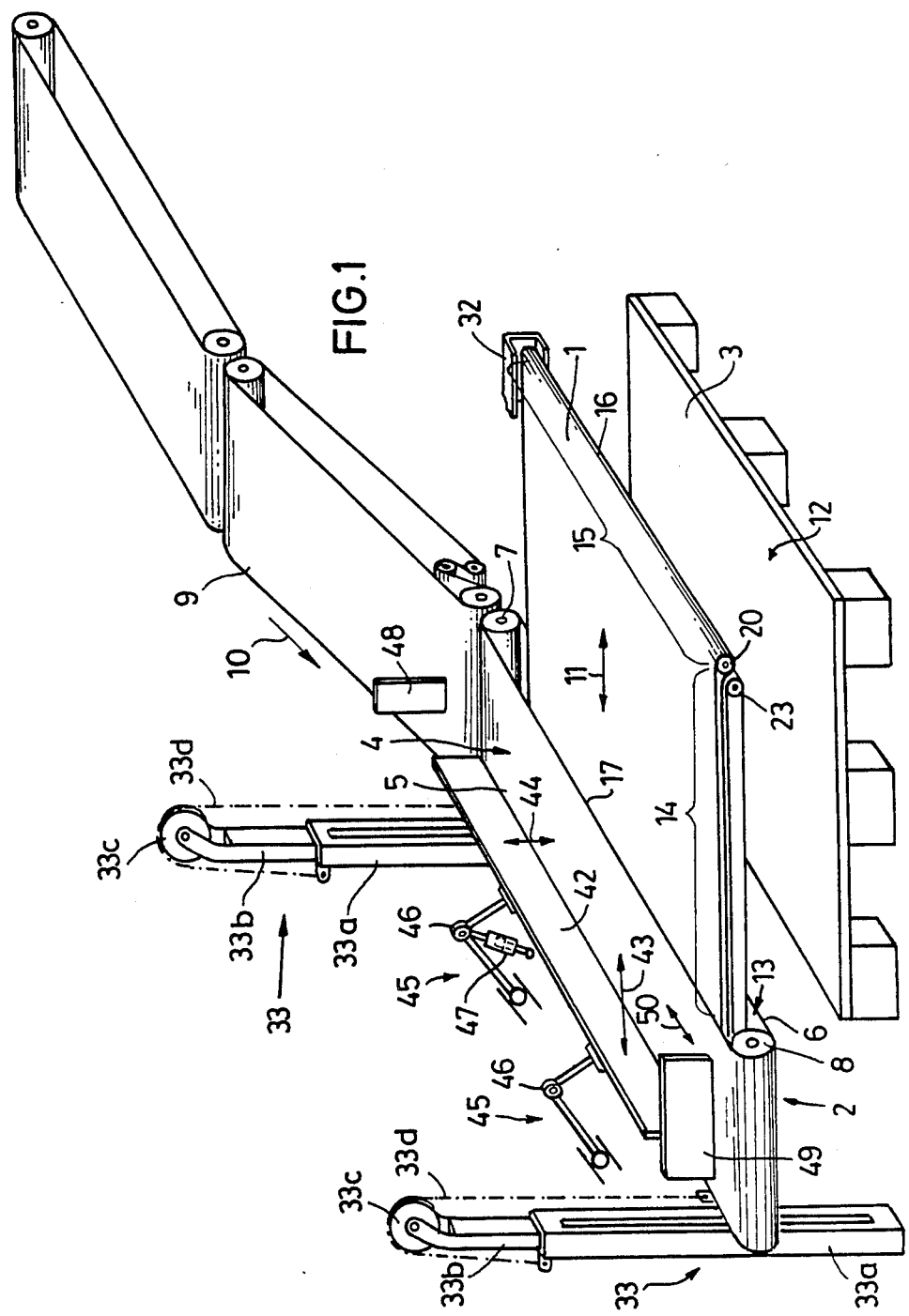

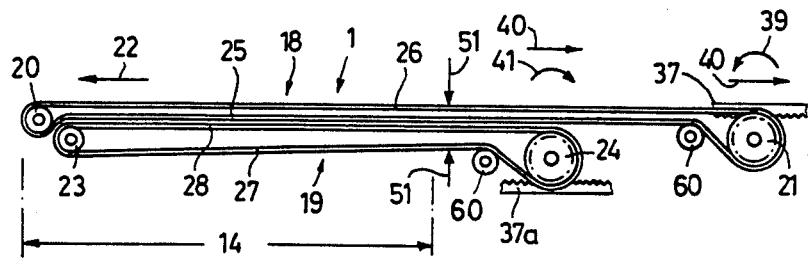
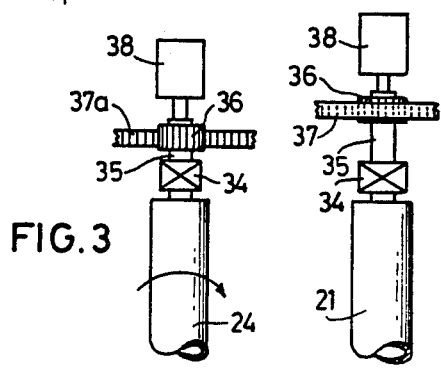
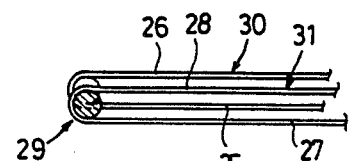
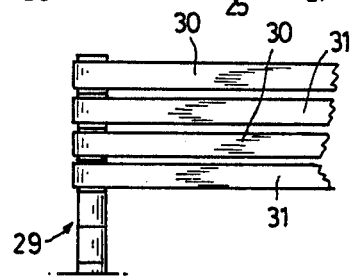

PALLETING DEVICE

BACKGROUND OF THE INVENTION

The invention relates to a device for palleting slab-form products, especially book blocks or books.

With known devices of this type, there is first of all formed a series of a predetermined number of the products on a conveyor belt, and the series is thrust laterally onto a horizontally borne plate. This process is repeated until there is formed a so-called set of a certain number of adjacently arranged rows. The plate is disposed over a pallet which is raisable and lowerable with a corresponding arrangement. After completion of the set, the plate is drawn in along the set plane and parallel to the edge of the conveyor belt which is adjacent to the set position. By a stationary pressing, the products of the set are pushed from the plate, so that the products are deposited directly on the floor of the pallet or on the uppermost product layer for the formation of a stack in layers. Such a device is disclosed in German unexamined patent specification OS No. 27 18 338.

With such above device, it is possible, to be sure, to form stacks in which by previous turning, the slab-form products occupy different positions in individual rows. But it is not possible, as desired in many cases of utilization, to provide gaps or spaces between the product rows. With such spaces and with a composite stack, the stability of the stacked products on the pallet can be improved. In the stripping of a product layer from the plate, friction is generated between the products and the plate, which can impair the quality of sensitive products. Between the plate and the uppermost product layer on the pallet, there must be provided a sufficient vertical spacing so that the plate, when being withdrawn, does not come in contact with the products on the pallet so as to tear into and damage the stack. This vertical spacing, however, can impair the positionally accurate depositing of the products on the uppermost layer, because the products in the stripping thereof must overcome this height difference and can, in the process, slip uncontrolled so as to act upon the freestanding stack on the pallet in such a way that the uppermost products slip or the stack partly collapses.

A further disadvantage of such known device is that the pallet has to be lowered after such layer formation. This movement is not always free of jarring, so that it can occur that the already formed, relatively high free-standing stack, as a result of such jarrings, collapses entirely or in part.

Another, similar palleting device operates with a forward and back as well as an up-and-down stacking arm, such as disclosed in German unexamined patent specification OS No. 31 39 828, where the stacking arm can be driven into any desired position over a pallet. The stacking arm consists essentially of a horizontally arranged endless conveyer belt with upper and lower belt portions. A plate is arranged between the belt portions, with the plate being movable forward and back from the belt portions. On the conveyer belt, there is first of all formed a product row, possibly with spacings between the products. A pusher thrusts the product row laterally out from the conveyer belt onto the driven-out plate. The plate is disposed over the uppermost row of the pallet, onto which the product row from the plate is to be deposited. The plate is withdrawn with the pusher being at a standstill, so that the products are stripped off by the pusher.

With this latter known palleting device it is possible, to be sure, to stack one row on another row and with spacings between the stacked rows, where the spacings can be formed by the corresponding travel of the stacking arm over the pallet or by the corresponding travel of the pallet itself after the formation of the rows on the pallet. The stripping of the product row from the plate, however, can also bring about the disadvantages arising in the other device already described above, being brought about by the friction. Furthermore, in this latter case, too, the stripping can impair the positionally accurate depositing of the product row. Moreover, in each case, only one row and no entire set can be deposited on the pallet, which can decrease the palleting speed.

From the disclosure of German OS No. 30 24 133, there is known a conveying and/or stacking device, especially for individually light and easily deformable goods, such as for example, magazines. This device consists of a movable transport frame with a flat, overhanging carrying element forming a support surface, which can be drawn forth from under the deposited transport material, and which thereupon can be thrust back into the carrying position. The carrying element consists of two steel plates arranged one over the other, each plate being drawn over with a band, and each band being fastened to the machine frame. The band of the upper plate is firmly seated in the region of the upper belt side, and the band of the lower plate is firmly seated in the region of the lower belt side. In the withdrawal of the carrying element, it is achieved that the belts stand still, so that no relative movement takes place between the surface of the carrying element and the carried stack, as well as with respect to the stack on which the carried stack is to be deposited.

The latter known device makes it possible that the carrying element, before the withdrawing thereof, can be emplaced on the stack on which the carried stack is to be deposited, in which process there can also be generated a pressing or pushing of the lower stack. The layer-like formation of a stack is not directly offered by this known device, because it is difficult, during the traveling out of the carrying element, to arrange a product set or layer on the carrying element.

SUMMARY OF THE INVENTION

An object of the present invention is to provide a device with which products can be laid layer-like and/or spaced, so as to be very accurately positioned onto a pallet, without the products being able to slip and endanger an already formed stack.

Briefly, the present invention is directed to a device for the palleting of slab-form products, especially of book blocks or books, being provided with a feed arrangement for the products, an arrangement for the formation of a product row, and an arrangement for the reception of a product layer including several product rows. The reception arrangement includes a simple single rolling band, and in particular, a double rolling band with an endlessly guided upper band and an endlessly guided lower band arranged directly under the upper band, and drive means for advancing and retracting the rolling band. The upper and lower bands are driven oppositely in the retraction, in such a manner that the upper band portion of the upper band and the lower band portion of the lower band are rolled off the product layer and pallet, respectively. The upper band and the lower band stand still relatively to each other in the advancing of the double rolling band.

BRIEF DESCRIPTION OF THE DRAWINGS

With the above and additional objects and advantages in view, as will hereinafter appear, this invention comprises the devices, combinations and arrangements of parts hereinafter described by way of example, and illustrated in the accompanying drawings of preferred embodiments in which:

FIG. 1 shows schematically a perspective view of a device for palleting, according to the present invention;

FIG. 2 shows schematically a side view of a double rolling band of the device shown in FIG. 1;

FIG. 3 shows schematically a top plan view of a drive arrangement of the double rolling band; and FIGS. 4a and 4b show schematically side and top plan views of a special arrangement of a front edge of the double rolling band.

In the various figures of the drawings, like reference characters designate like parts.

DETAILED DESCRIPTION OF THE PREFERRED EMBODIMENTS

According to the present invention directed to a palleting device, on a single or double rolling band 1 of a stacking arm 2, as shown in FIG. 1, there is formed a product layer or set not shown. The layer is deposited by the withdrawing or the retracting of the rolling band 1, onto a pallet 3 which is provided under the rolling band 1. The single or simple rolling band is not separately depicted in the drawings, but it corresponds to the double rolling band 1 with the exception of the lower band 19, which is absent. Thus, the functioning of the single rolling band corresponds solely to the upper band 18.

The stacking arm 2 is preferably arranged to travel vertically up and down besides the likewise horizontally arranged double rolling band 1. The stacking arm 2 includes essentially an endless transport band 4 drivable in a known manner. The band 4 includes an upper band portion 5 and a lower band portion 6, as well as a deflecting roll 7 defining a front roll as viewed in the transport direction of the product as indicated by the arrow 10, and a rear deflecting roll 8 for supporting the band 4. Adjacent of the front deflecting roll 7, the stacking arm 2 is appropriately in an articulated connection with a feed telescoping band 9 which is arranged in front of the transport band 4 and can transfer the products in the transport direction, as indicated by the arrow 10 onto the transport band 4.

An intermediate space 13 is provided between the upper band portion 5 and the lower band portion 6 of the transport band 4, where the vertical height of the space 13 can be arbitrarily high, because no pallet is present underneath the band 4. The double rolling band 1 is receivable in the space 13, being borne drivable forward and back through the space 13 in the direction of the arrow 11. The stack location 12 is positioned under the double rolling band 1, but is laterally in front of the transport band 4. From this arrangement, it results that the thickness of the transport band 4 or the vertical height of the intermediate space 13 is not critical, because the transport band 4 in the stacking operation is not disposed over the pallet 3, and therefore is not limited by the pallet 3.

Over the pallet 3, there is driven only the double rolling band 1. The width 15 and the usable length 14 of the band 1 are chosen in such a way that the double rolling band 1 can completely cross the pallet 3. The double rolling band 1 is arranged, furthermore, in such a way that it can be drawn back into the space 13 so that its front edge 16 aligns approximately with the side edge portion 17 of the transport band 4.

The double rolling band 1 includes an endlessly guided upper band 18 and an endlessly guided lower band 19 arranged directly under it, as best shown in FIG. 2. What is essentially, is that the bands 18, 19 are constructed to drive in opposite directions, but with the same speed, and being borne in such a way that at least the front deflecting rolls 20, 23 of the bands 18, 19, respectively, can be advanced and withdrawn together. In the withdrawing of the band 1, the upper band portion 26 of the upper band 18 and the lower band portion 27 of the lower band 19 are rolled out. The bands 18, 19 stand still relative to each other in the advancing of the double rolling band 1 and are not driven. The above procedures will be explained below.

An expedient form of execution of the double rolling band 1 is shown schematically from the side in FIG. 2. The upper band 18 is guided over and around a front deflecting roll 20 and a rear deflecting roll 21. The lower band 19 is guided over and around a front deflecting roll 23 and a rear deflecting roll 24. The rolls 23 and 24 are arranged underneath and between the rolls 20 and 21, with the roll 20 overhanging the roll 23. In this arrangement, the lower band portion 27 of the lower band 19 and the lower band portion 25, extend downwardly respectively from the rolls 23 and 20 to the rolls 24 and 21. Both the rolls 24 and 21 are positioned outside the region of the usable length 14 of the band 1.

In order to assure that the double rolling band 1 is as thin as possible within the region of the usable length 14, the bands 18, 19 are set within one another. Accordingly, the lower band portion 25 of the upper band 18, which in the withdrawing of the double rolling band 1 and the drive of the bands 18, 19 has the same running direction as the upper band portion 28 of the lower band 19, is pressed up by the upper band portion 28 for the entire course of the usable length 14. Furthermore, the deflecting roll 23 is positioned as near as possible behind the deflecting roll 20, and the deflecting rolls 20 and 23 are formed as small as possible in diameter. The deflecting rolls 21 and 24 are formed, however, as depicted, preferably with larger diameters in order to assure a secure drive of the bands.

For the above purpose, there are arranged tensioning rolls 60 immediately after the rolls 21 and 24. The tensioning rolls 60 engage, in each case, under the lower band portions 25, 27 and push the lower band portions upward or deflect them so that the upper and lower band portions of the bands 18, 19 run substantially parallel in the region of the usable length 14. Thus, the spacing between the upper band portion 26 of band 18 and the lower band portion 27 of band 19 is extremely small in the vertical direction.

The bands 18, 19 are preferably full-surfaced bands. It can, however, also be expedient to form the lower band 19 of individual straps arranged and guided parallel to one another, these individual straps being conducted over individual rolls 23.

According to another form of execution of the present invention, instead of the deflecting rolls 23, 23, there is provided only a single deflecting profile member 29, as shown in FIGS. 4a and 4b. The profile member 29 is formed from friction material and has rounded front edges. Over the deflecting profile member 29, there are conducted narrow straps or belts 30, 31, the upper straps 30 forming the upper band 18 and the lower straps 31 forming the lower band 19. Laterally adjacent each strap 30 there is a strap 31 in an alternating arrangement, in which arrangement the semicircular guide track of the straps 31 is in each case set lower, in step form, than the adjacent straps 30, so that the lower band portions 27 of the straps 31 are below the lower band portions 25 of the straps 30. The straps 30, 31 only slide over the deflecting profile member 29, where the profile member 29 does not itself turn. With such a deflecting profile member, there can likewise be brought about a very small vertical spacing between the upper band portions 26 of the straps 30 and the lower band portions 27 of the straps 31.

The rolls 20 and 23, respectively, or the deflecting profile 29, as well as the rolls 21, 24 and 60 are borne with, for example, corresponding end-side rolls or the like, not shown, in a manner known per se, laterally to the right and to the left thereof in rails 32, where only a fraction of one of the rails 32 is shown in FIG. 1 in order not to disturb the perspicuity of the drawing. The rails 32 are fixed to the carrying arm 2 or are seated together with the carrying arm 2 on the telescoping columns 33 represented in FIG. 1, the assignment and functioning of which is explained further below.

In order to assure the rolling off of the upper band portion 26 and of the lower band portion 27 during the withdrawing of the double rolling band 1, and in order to assure that the upper band 18 and the lower band 19 stand still relatively to each other during the advancing of the double rolling band 1, an arrangement is provided according to the example schematically represented in FIG. 3. In this arrangement, the rolls 21 and 24 are connected, in each case, over a free wheeling or coupling member 34 with their axial shaft 35. As is well known, such couplings 34 are in engagement when rotated in one direction, and out of engagement when rotated in the opposite direction.

In at least one free lateral end of the axles 35, there is fastened a pinion or gear wheel 36. The gear wheels 36 each engage into a horizontally arranged, fixed gear rack 37, 37a, which, for example, are preferably seated in the rails 32, such seating is not shown. The gear rack 37 is arranged over the axle 35 of the roll 21, and the gear rack 37a is arranged under the axle 35 of the roll 24, as best shown in FIG. 2. At least one gear rack 37, 37a is associated with a drive member, for example, the drive shaft of a motor 38 connected to the gear wheel 36. In this system, the rolls 20, 21, respectively, or the deflecting profile member 29, as well as the rolls 23, 24 and 60 are coupled with one another, preferably rigidly, in such a way that their relative spacing with one another remains constant during the movement of the double rolling band 1 in the rails 32.

In the withdrawing or retracting of the double rolling band 1 in the direction of the arrow 40, shown in FIG. 2, which can be brought about by the drive motor 38, the roll 21 is turned by the drive shaft in the direction of the arrow 39, because the free wheeling of the roll 21 is blocked by the coupling 34 which is now in engagement. Thus, the surface of the upper band portion 26 stands still relative to the rail 32, the gear rack 37 and the transport band 4, where the upper band portion 26 rolls off downwardly around the roll 20 and upwardly around the roll 21. The roll 24 turns in an equivalent manner, but in an opposite direction as indicated by the arrow 41, so that the surface of the lower band portion 27 stands still relatively to the rails 32, the gear rack 37 and the transport band 4, and the rolling off is upward around the roll 23 and downward around the roll 24.

In the advancing of the double rolling band in the direction of the arrow 22 shown in FIG. 2, the two bands 18 and 19 should not move relatively to each other, i.e. they must not be driven when the double rolling band 1 is moved or shifted forwardly. This is achieved by the free wheeling action of the couplings 34, which are now out of engagement, so that only the axles 35 are moved turning translationally, without either of the rolls 21, 24 turning. Obviously, there are usable drive means other than the preferred ones described, which can assure that the bands 18, 19 in the withdrawal of the band 1 are driven with the roll-off of the band portions 26 and 27, and that the bands 18, 19 stand still relatively to each other in the advancing of the double rolling band 1.

In an especially suitable form of execution of the present invention, the stacking arm 2 is borne driveably up and down on telescopic columns 33, as shown in FIG. 1. The telescopic columns 33 are spaced from one another, being laterally adjacent to the transport band 4, in each case being in the region of the axles of the deflecting rolls 7 and 8. The axes of these deflecting rolls 7, 8 are borne in, for example, traverses, not shown, the construction of which are well known, on which there can also be seated the rails 32. The traverses are drivable up and down, being guided on the telescopic columns 33, for example, with slide pieces in the vertically running grooves of the column pieces 33a, in a manner known per se. In the hollow column pieces 33a, there are inserted column pieces 33b to move up and down, also in a known manner. On the free ends of the column pieces 33b, there is provided, in each case, a roll 33c turnable about a horizontal axis, over which there is guided a cable 33d which is fastened at one end to the hollow column piece 33a, and with the other cable end being fastened to the stacking arm 2, for example, on the traverse.

The columns 33 can be mounted on a mobile carriage, not shown, so that the palleting device can be displaced directly. The telescopic columns 33 provide a low structural height for the palleting device, and offer between the columns 33, a sufficient horizontal space into which the double rolling band 1 can be thrust during the withdrawing thereof. Accordingly, the rails 32 will cross the intermediate space between the telescopic columns 33, not shown.

It is noted, to reduce the space requirement, the rails 32 between the telescopic column 33 can be bent downwardly so that the double rolling band 1 during the withdrawal, for example, with the fixed rolls 60 and corresponding guide rolls or similar sliding means that maintain the spacing between the band portions constant, can be conducted downward.

Instead of the telescoping columns, according to a further development of the present invention, directly under the stacking arm 2 there can be arranged preferably a drivable scissor-lift table of known construction type, which would carry the stacking arm 2 with the double rolling band 1 and possibly the feed telescoping band 9 in a suitable manner. This latter version of the bearing of the stacking arm 2 is not separately represented, because scissor-lift tables are known per se.

Such scissor-lift tables would reduce the space requirement of the palleting device, and would assure a very accurate elevational adjustment of the stacking arm 2.

According to the present invention, there is provided a pusher 42 over the upper band portion 5 of the transport band 4, the pusher 42 extending in longitudinal direction of the band 4. The pusher 42, in a manner known per se, is guided forward and back in the directions indicated by the arrow 43, and up and down in the directions indicated by the arrow 44. For the forward and return thrusting of the pusher 42, preferably elbow-lever arrangements 45 are provided. One end of each arrangement 45 is pivotally secured to a fixed place on the stacking arm 2, and the other end is pivotally secured on the pusher 42. In this sytem, a drive means acts on the joint member 46 of at least one of the elbow-lever arrangements 45, for example, a piston-cylinder arrangement 47 for the extending-out and bending-in of the elbow-lever arrangement 45. This elbow-lever drive 47 provides for a delayed down-thrust movement, so that products present on the upper band portion 5 of the band 4 can be thrust with a gentle delay onto the double rolling band 1.

The space or gap formation in a row of products can be brought about in a known manner with a stopper which is arranged in the region of the transition between the feed band 9 and the transport band 4 of the stacking arm 2. There can also be provided a space or gap formation without such a known stopper, wherein a photoelectric cell 48 is positioned over the bands in the region of the transition between the feed band 9 and the transport band 4, as shown in FIG. 1. The photoelectric cell 48, in a known manner, registers arriving products and controls the speed of the transport band 4 in combination with the speed of the feed band 9 in such a way that the exact spacings can be established between the products.

When no space or gap formation is desired, the products are transported against a stop 49, which is arranged to be shiftable in the directions of the arrow 50 over the upper band portion 5 of the transport band 4, where a damping arrangement is provided to reduce the impact of the products. The space or gap formation between the rows of a layer or set occurs through the preselectable advance interval of the double rolling band 1 in the advancing thereof.

The palleting device of the present invention operates as follows:

From the feed band 9, the products are moved along in series and a certain number of them are conveyed onto the transport band 4. The double rolling band 1 is now in a rearward or retracted position and projects out, for example, only by about one product row width from the transport band 4. The pusher 42 thrusts the row from the transport band 4 onto the double rolling band 1 and is returned, in which process there can already be formed another row when the pusher is moved upward, and to the rear, and then again downward.

The double rolling band 1 is now advanced by a certain interval, so that place is made for the next row on the double rolling band 1. The advancing occurs preferably synchronously with the thrusting-on movement of the pusher 42, so that no relative movement is generated between the products and the upper surface of the rolling band 1. In this manner described, a layer of the products is formed, with or without the above mentioned spaces or gaps.

When the layer is complete, the double rolling band 1 is retracted, in which process the upper and lower band portions 26 and 27 roll off in the manner set forth above. Thus, there takes place, accordingly, no relative movement of any kind between the upper band portion 26 and the products during the roll-off process. Since also the lower band portion 27 stands still during the roll-off, the double rolling band 1 when being withdrawn can be emplaced on the uppermost layer or stack positioned on the pallet, so that the spacing between the layer newly to be laid and the uppermost pallet layer or stack is optimally small. Furthermore, through this emplacing of the double rolling band 1 upon the pallet stack, the pallet stack is supported.

In the advancing, the double rolling band 1 is either raised far enough so that the lower band portion 27 does not touch the uppermost pallet layer or stack, or preferably the lower band 19 is driven in such a way that the lower band portion 27 is also rolled off in the advancing of the rolling band 1, as per the retraction thereof. In this latter case, the double rolling band 1 can be positioned at a sufficient height over the last layer on the pallet; so that the lower band portion 27 in the advancing of the double rolling band 1 comes to lie upon the uppermost layer on the pallet by rolling off downwardly thereon.

It lies within the scope of the present invention to combine the double rolling band arrangement, described herein, with other feed arrangements that form a product row, which provide a device with which the row can be brought positionally accurately onto the double rolling band. The term "double rolling band" in the scope of the present invention comprises not only bands, but also similarly acting transport means, such as, for example, roller tracks, rod tracks or the like.

It also lies within the scope of the present invention, to provide the rolling off action by clamping the rolling upper and lower band portions 26, 27 with a suitable braking or clamping device as indicated by the arrows 51, so that they stand still in the manner set forth above. The braking or clamping device would replace the drives 38, the gear wheels 36, and the gear racks 37, 37a, as well as the couplings 34. Accordingly, it would be necessary only to drive the frame that carries the rolling band device.

Numerous alterations of the structure herein disclosed will suggest themselves to those skilled in the art. However, it is to be understood that the present disclosure relates to preferred embodiments of the invention which are for purposes of illustration only and are not to be construed as a limitation of the invention.

What is claimed is:

1. In a device for the palleting of slab-form products, especially of book blocks or books, provided with a first arrangement for feeding the products, a second arrangement for forming the products into a product row, and a third arrangement for receiving a product set consisting of several product rows, with the third receiving arrangement being provided with drive means for advancing and retracting the third receiving arrangement relatively to the second forming arrangement, an improvement comprising:

said third receiving arrangement including a double rolling band;

said double rolling band including a first endlessly guided upper band and a second endlessly guided lower band;

said first upper band having upper and lower band portions;

said second lower band having upper and lower band portions;

said lower band portion of said second lower band being spaced below said upper band portion of said first upper band;

said first upper band being provided with a first coupling, and said second lower band being provided with a second coupling;

each of said first and second couplings having an out-of-engagement arrangement with respect to said drive means so that the double rolling band is not driven during said advancing of said third arrangement and so that said first upper band remains stationary relatively to said second lower band; and each of said first and second couplings further having an in-engagement arrangement with respect to said drive means for driving said first upper and second lower bands in opposite directions during said retracting of said third receiving arrangement in such a manner that an upper surface of said upper band portion of said first upper band remains stationary relatively to a lower surface of said lower band portion of said second lower band and to said second forming arrangement to provide a roll-off relationship between said upper band portion of said first upper band and the product set when the product set is disposed on said upper surface so that said upper band portion of said first upper band rolls off from under the product set when said third receiving arrangement is retracting, and to also provide a roll-off relationship between said lower band portion of said second lower band and a pallet on which said lower surface rests so that said lower band portion of said second lower band rolls off from above said pallet in order for said pallet to receive the product set thereon.

2. A device according to claim 1, wherein said first upper band of said double rolling band is conducted over a front deflecting first roll and over a rear deflecting second roll, and said second lower band is conducted over a front deflecting third roll and over a rear deflecting fourth roll, said third and fourth rolls being arranged underneath and between said first and second rolls, said lower band portion of said second lower band and said lower band portion of said first upper band extending downwardly towards said rear second and fourth rolls, said rear second and fourth rolls being positioned outside a usable length of said double rolling band.

3. A device according to claim 2, wherein said first and second bands are set in one another with said lower band portion of said first upper band being pressed up by said upper band portion of said second lower band along an entire region of said usable length, said front deflecting third roll being positioned immediately behind said front deflecting first roll.

4. A device according to claim 2, wherein said rear deflecting second and fourth rolls have a greater diameter than said front deflecting first and third rolls, and tensioning rolls are arranged adjacent to said rear second and fourth rolls for engagement under said lower band portions of said first and second bands to deflect said lower band portions upwardly.

5. A device according to claim 2, wherein each of said rolls are seated laterally in a pair of spaced apart rails for slidable forward and backward movement therein, said rails carrying said double rolling band during said advancing and retracting.

6. A device according to claim 1, wherein said first and second bands are conducted over a front deflecting profile member, each of said first and second bands includes narrow straps providing upper and lower straps respectively, said upper and lower straps being disposed in semicircular guide tracks provided on said profile member, said semicircular guide tracks for said lower straps being lower stepwise relatively to said semicircular guide tracks for said upper straps so that lower band portions of said upper straps overhang lower band portions of said lower straps, and upper band portions of said upper straps overhang upper band portions of said lower straps.

7. A device according to claim 1, wherein said double rolling band is arranged between upper and lower band portions of a transport band mounted on a stacking arm of said second forming arrangement, said stacking arm being drivable up and down.

8. A device according to claim 7, wherein said stacking arm is borne to travel up and down on telescoping columns spaced from one another, said telescoping columns being positioned laterally adjacent to said transport band, each telescoping column being in a region of an associated axle of deflecting rolls supporting said transport band.

9. A device according to claim 8, wherein each axle of said deflecting rolls of said transport band is borne in a traverse, supporting rails of said double rolling band being seated on a respective one of the traverses, said traverses being guided up and down on said telescoping columns.

10. A device according to claim 8, wherein said telescoping columns include hollow column members receiving therein drivable up and down column pieces, a roll turnable about a horizontal axle being disposed on a free end of each column piece, a cable-like member being conducted over each roll of said column pieces, one end of each cable-like member being secured to an associated hollow column member and the other end of each cable-like member being secured to said stacking arm.

11. A device according to claim 7, wherein a pusher is disposed over said upper band portion of said transport band, said pusher extending in a longitudinal direction of said transport band, said pusher being guided in a forward and backward direction and in an up and down direction relatively to said transport band.

12. A device according to claim 11, wherein an elbow-lever arrangement is provided to effect movement of said pusher in said forward and backward directions, one end of said elbow-lever arrangement abutting with a fixed place on said stacking arm, and the other end of said elbow-lever arrangement being secured on said pusher, and drive means acting on a member of said elbow-lever arrangement.

13. A device according to claim 7, wherein a feed band is arranged in front of said transport band, a control arrangement is disposed between said feed band and said transport band for controlling speed of said feed and transport bands and for registration of the products.

14. A device according to claim 13, wherein said control arrangement includes a photoelectric cell.

15. A device according to claim 7, wherein a stop is provided adjacent a rear portion of said transport band and extends transversely over said upper band portion of said transport band, said stop being adjustable in a forward and rearward direction along said transport band, said stop being provided with a damping arrangement.

16. A device according to claim 1, wherein said double rolling band includes roller tracks.

17. A device according to claim 1, wherein said double rolling band includes rod tracks.

18. A device according to claim 1, wherein said double rolling band is flexibly constructed, and includes means for conducting said double rolling band upwardly and downwardly outside a stacking place for the product set.

19. A device according to claim 1, wherein said double rolling band is mounted on at least one front roll and a pair of rear rolls, an axle of each of said rear rolls being connected to said first and second couplings respectively.

20. A device according to claim 19, wherein a free lateral end of said axle of each of said rear rolls is connected to a gear wheel, each said gear wheel being engaged in a horizontally arranged fixed gear rack seated in a rail, each said gear rack being arranged adjacent said axle of an associated one of said rear rolls, each said gear wheel being connected with a drive member, and said front and rear rolls being rigidly coupled with one another to provide a constant spacing therebetween during said advancing and retracting of said double rolling band in said rail.

* * * * *